United States Patent
Godlewski

(10) Patent No.: US 7,650,298 B2
(45) Date of Patent: Jan. 19, 2010

(54) AUTOMATED INVENTORY SYSTEM AND METHOD

(75) Inventor: Peter Godlewski, San Clemente, CA (US)

(73) Assignee: Nexiant, Lake Forest, CA (US)

(*) Notice: Subject to any disclaimer, the term of this patent is extended or adjusted under 35 U.S.C. 154(b) by 37 days.

(21) Appl. No.: 11/528,104

(22) Filed: Sep. 27, 2006

(65) Prior Publication Data

US 2007/0250413 A1    Oct. 25, 2007

Related U.S. Application Data

(60) Provisional application No. 60/788,461, filed on Mar. 31, 2006.

(51) Int. Cl.
*G06Q 10/00* (2006.01)

(52) U.S. Cl. ............................................. 705/28

(58) Field of Classification Search .............. 705/28
See application file for complete search history.

(56) References Cited

U.S. PATENT DOCUMENTS

| | | | |
|---|---|---|---|
| 4,419,734 A | 12/1983 | Wolfson et al. | |
| 4,563,739 A | 1/1986 | Gerpheide et al. | |
| 5,207,784 A | 5/1993 | Schwartzendruber | |
| 5,608,643 A | 3/1997 | Wichter et al. | |
| 5,654,508 A | 8/1997 | Gibbs | |
| 5,671,362 A | 9/1997 | Cowe et al. | |
| 5,708,223 A | 1/1998 | Wyss | |
| 5,848,593 A | 12/1998 | McGrady et al. | |
| 6,012,041 A | 1/2000 | Brewer et al. | |
| 6,232,870 B1 * | 5/2001 | Garber et al. | 340/10.1 |
| 6,341,271 B1 | 1/2002 | Salvo et al. | |
| 6,430,268 B1 | 8/2002 | Petite | |
| 6,669,089 B2 * | 12/2003 | Cybulski et al. | 235/385 |
| 6,681,990 B2 | 1/2004 | Vogler et al. | |
| 6,924,781 B1 * | 8/2005 | Gelbman | 345/85 |
| 6,927,692 B1 * | 8/2005 | Petrinovic | 340/572.1 |
| 6,988,080 B2 | 1/2006 | Zack et al. | |
| 6,996,538 B2 | 2/2006 | Lucas | |
| 7,009,519 B2 | 3/2006 | Leonard et al. | |
| 2002/0010659 A1 | 1/2002 | Cruse et al. | |
| 2002/0107744 A1 | 8/2002 | Rosenberg et al. | |

(Continued)

FOREIGN PATENT DOCUMENTS

EP    0915325    5/1999

(Continued)

OTHER PUBLICATIONS

Business Editors, High-Tech Writers. "Ultrexx Corporation's Java Based Inference Engine Targets Cell Phone and Handheld Device Market." Business Wire Aug. 18, 1999 Business Dateline, ProQuest. Web. Aug. 16, 2009.*

*Primary Examiner*—Matthew S Gart
*Assistant Examiner*—Oluseye Iwarere
(74) *Attorney, Agent, or Firm*—Knobbe, Martens, Olson & Bear, LLP

(57) ABSTRACT

Embodiments of this invention are directed towards various sensing mechanisms for bins of an automated inventory system. Further, various communication infrastructures and schemes between the various system components are disclosed. The automated inventory system comprises a plurality of dispensing bins containing stocked items. Various sensors may be used to detect the level or quantity of items within the various bins of the system. If a particular threshold level or quantity in the bin is triggered, a reorder signal is transmitted. The reorder signal may be communicated to other system components via hardwired and/or wireless connections. An RFID reader device may be used to collect reorder data regarding the various bins.

7 Claims, 10 Drawing Sheets

U.S. PATENT DOCUMENTS

| | | |
|---|---|---|
| 2002/0128957 A1 | 9/2002 | Rosenberg et al. |
| 2002/0161652 A1 | 10/2002 | Paullin et al. |
| 2002/0174001 A1 | 11/2002 | Henry |
| 2002/0183882 A1* | 12/2002 | Dearing et al. ............... 700/115 |
| 2003/0006281 A1* | 1/2003 | Thomas et al. ............... 235/385 |
| 2003/0023501 A1 | 1/2003 | Alling |
| 2003/0023503 A1 | 1/2003 | Alling |
| 2003/0093307 A1 | 5/2003 | Renz et al. |
| 2003/0216969 A1 | 11/2003 | Bauer et al. |
| 2003/0225635 A1 | 12/2003 | Renz et al. |
| 2004/0034581 A1* | 2/2004 | Hill et al. ...................... 705/28 |
| 2004/0056091 A1 | 3/2004 | Overhultz et al. |
| 2004/0186794 A1 | 9/2004 | Renz et al. |
| 2005/0027603 A1 | 2/2005 | Green |
| 2005/0065820 A1 | 3/2005 | Mallett et al. |
| 2005/0108114 A1 | 5/2005 | Kaled |
| 2005/0119915 A1 | 6/2005 | Mallett et al. |
| 2005/0122564 A1 | 6/2005 | Zehner et al. |
| 2005/0167489 A1 | 8/2005 | Barton et al. |
| 2005/0168345 A1 | 8/2005 | Swafford, Jr. et al. |
| 2005/0177466 A1 | 8/2005 | Willins |
| 2005/0190072 A1 | 9/2005 | Brown et al. |
| 2005/0211775 A1 | 9/2005 | Vaseloff et al. |
| 2005/0234784 A1 | 10/2005 | McClellan et al. |
| 2006/0015414 A1 | 1/2006 | Congram et al. |

FOREIGN PATENT DOCUMENTS

| | | |
|---|---|---|
| EP | 0916932 | 5/1999 |
| EP | 0969272 | 1/2000 |
| GB | 2299074 | 9/1996 |
| JP | 09-278126 | 10/1997 |
| WO | WO 2005/098706 | 10/2005 |

\* cited by examiner

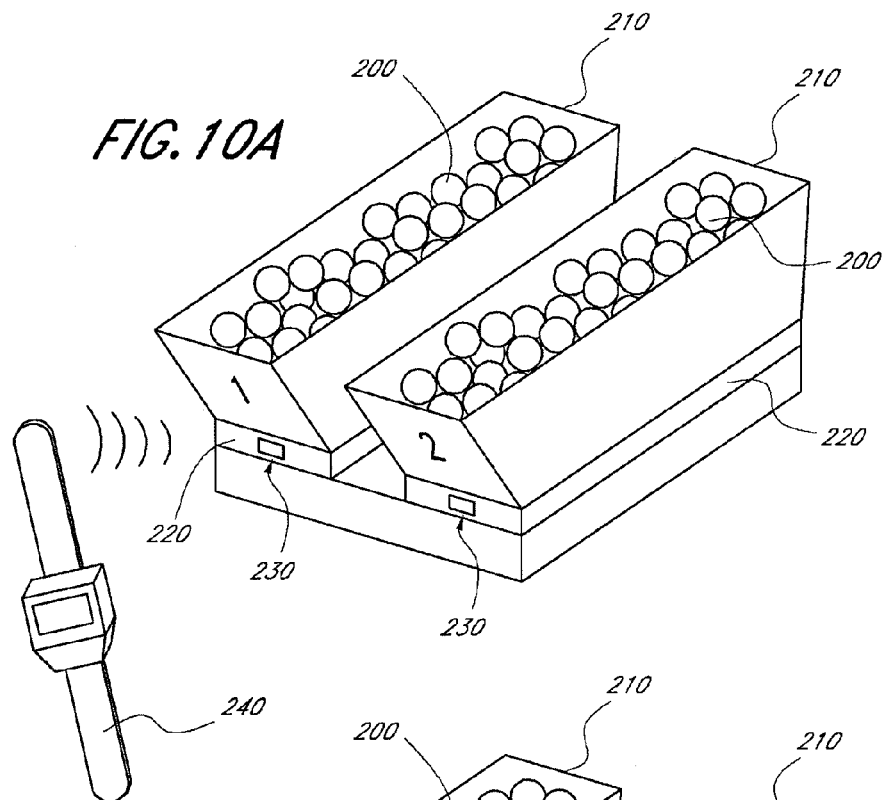
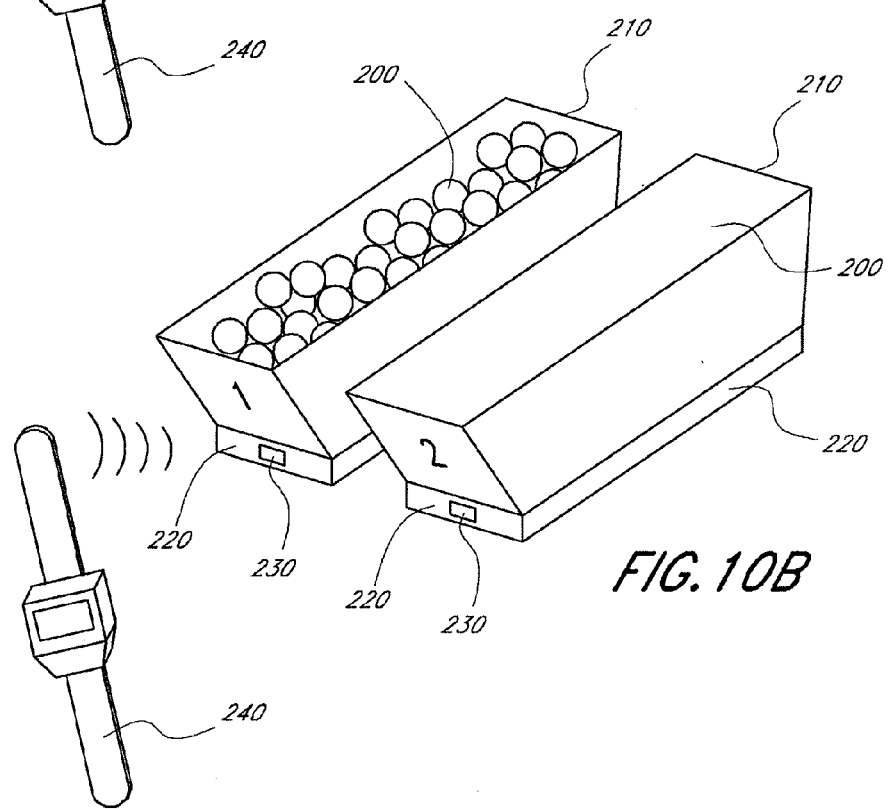

AUTOMATED INVENTORY SYSTEM AND METHOD

RELATED APPLICATION

This application is related to, and claims priority from, U.S. Provisional Patent Application No. 60/788,461, filed Mar. 31, 2006.

The entirety of Provisional Patent Application No. 60/788, 461, filed Mar. 31, 2006, is hereby incorporated by reference herein and made a part of the present disclosure.

BACKGROUND OF THE INVENTION

1. Field of the Invention

The present invention relates to automated inventory systems, in general, and specifically to an automated inventory system that produces a reorder signal when the level of stock items contained within a particular bin drops below a reorder threshold. The reorder signal may be communicated to other system components via hardwired and/or wireless connections.

2. Description of the Related Art

In most industrial operations, supplies are stored in centrally located storerooms, tool cribs or lockers. These supplies are manually requisitioned and taken to a work area to be used. The removal of these supplies is later input into an inventory system, often manually. Due to the inherent lag between removal and input, the inventory data is rarely up-to-date.

Thus frequently supplies that appear to be available on the inventory system may actually have been already used. When supplies reach critically low levels, they have to be reordered on an expedited or emergency basis, often at a premium, to minimize disruption of the work flow. The alternative is to maintain inventory at an unnecessarily high level, which increases overhead costs and decreases cash flow.

As long as inventory data is updated in an auditing manner, i.e., post use; it cannot reflect the actual availability of supplies. This shortcoming is exacerbated by increases in the turnover rate of supplies. When the turnover of supplies is slow compared to the lag, the probability of critical shortages is small. However, as the turnover of supplies increases, so does the lag because more inventory data have to be input, thereby increasing the likelihood that supplies that appear as available on the inventory system have already been used. Thus the frequency of critical shortages also increases.

A number of inventory systems currently exist that detect exact inventory levels within a dispensing unit and communicate the inventory data to a system that is configured to automatically reorder stocked items when the inventory drops below a predetermined level. However, such systems are too expensive for certain applications in which automatic indication of the need to reorder inventory is desired, but precise, real time inventory information is not necessary. For example, existing automated systems typically are too expensive for applications involving regularly used stocked items having a relatively low unit cost (e.g., nuts, bolts, washers, etc.).

SUMMARY OF THE INVENTION

In one embodiment of the present invention, a method of managing inventory comprises automatically sensing when a quantity of items within a bin drops below a reorder quantity, generating a reorder signal at the bin and communicating the reorder signal from the bin to a processor. In some embodiments, the method of managing inventory further comprises generating an order in response to the reorder signal. In another embodiment, communicating the reorder signal to a processor includes receiving the reorder signal with a reader device configured to receive the reorder signal and transmitting the reorder signal to the processor. In yet another embodiment, the reorder signal is received wirelessly using a handheld reader device.

In some embodiments, the method further includes automatically sensing when a quantity of items within a bin is above a reorder quantity, generating an adequate level signal indicating that the quantity of items is above the reorder level and communicating the adequate level signal from the bin to a processor. In one embodiment, communicating the reorder signal and the adequate level signal to a processor includes receiving the reorder signal and the adequate level signal with a reader device configured to receive said signals and transmitting said signals to the processor. In another embodiment, the receiving of the reorder signal and the adequate level signal is performed wirelessly using a handheld reader device.

In another embodiment, an automated inventory system comprises at least one bin configured to contain a plurality of stocked items and a platform configured to support said bin. The platform includes a first portion, a second portion movable relative to the first portion and a biasing member configured to maintain a resisting force between the first portion and the second portion. In some embodiments, the automated inventory system further comprises a sensor configured to detect when a threshold distance between the first portion and the second portion is attained, a processor and a data communication between the sensor and the processor. In one embodiment of the invention, the first portion and the second portion are rotatably coupled, such as by a hinge.

In some embodiments, an automated inventory system comprises at least one bin configured to contain a plurality of stocked items, a platform configured to support the bin, a wireless circuit associated with each said platform and a wireless reader device having at least one microcontroller unit. The wireless reader device may be configured to read a wireless signal transmitted by the wireless circuit upon completion of said printed circuit board. In one embodiment, the printed circuit board includes a switch configured to selectively complete the circuit board and a sensor configured to activate the switch. In other embodiments, the circuit is configured to transmit a RFID signal. In yet another embodiment, the wireless reader device is a portable, handheld unit.

In one embodiment of the present invention, a method of automatically maintaining a stocked item inventory includes providing a plurality of storage bins and providing a platform for each bin. In some embodiments, the platform comprises a wireless circuit including at least one printed circuit board, a switch configured to selectively complete the circuit board and a sensor configured to activate the switch. In one embodiment, the method of automatically maintaining a stocked item inventory further includes a wireless reader device comprising at least one microprocessor, and which is configured to read a wireless signal generated by the circuit and process bin level data associated with the wireless signal on the microprocessor and retransmitting the bin level data. In other embodiments, bin level data is retransmitted to a personal computer network. In another embodiment, bin level data is retransmitted to a computer network. In yet other embodiments, the wireless reader device is a portable, handheld unit.

BRIEF DESCRIPTION OF THE DRAWINGS

FIG. 10A is a perspective view of a two-bin system including a portable handheld device according to one embodiment of the present invention.

FIG. 10B is a perspective view of a two-bin system including a portable handheld device according to another embodiment of the present invention.

It is to be understood that the attached drawings are for the purpose of illustrating concepts of the present invention and may not be to scale.

DETAILED DESCRIPTION OF THE PREFERRED EMBODIMENT

Weight/Pressure Level Sensors

Figure 1:
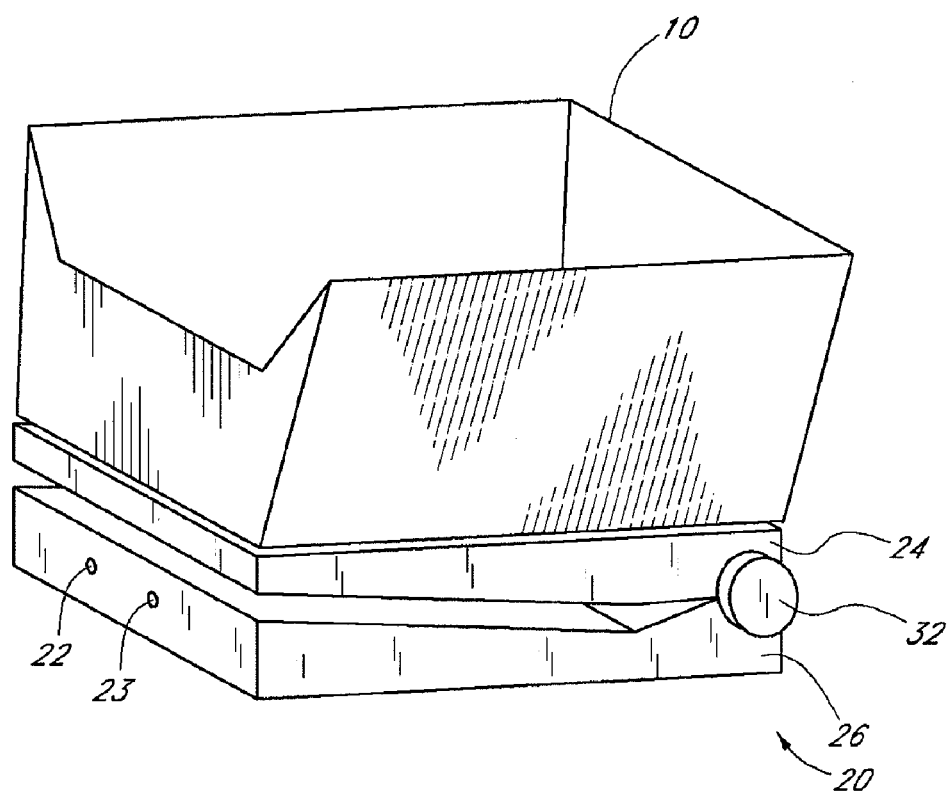
FIG. 1 is a perspective view of a bin positioned on a sensing platform according to one embodiment of the present invention.

FIG. 1 illustrates a storage bin 10 positioned on top of a sensing device 20. The bin 10 and device 20 are preferably a part of a larger automated inventory system comprising a plurality of storage bins for containing stocked items. In some embodiments, each bin 10 of the inventory system contains a single type of commonly stocked item. The bins 10 are particularly well-suited for a factory, workshop or other similar setting where there is great demand for easy access to regularly used tools, components and other articles (e.g., nuts, bolts, washers, gaskets, shims, etc.). Storage bins may be constructed of metal, plastic, cardboard or any other suitable material. The storage bins 10 may be secured or unsecured, depending on a variety of factors, including but not limited to the specific security concerns of a facility, the cost of the particular stocked item, the need for easy accessibility, etc.

In FIG. 1, the bottom surface of the bin 10 and the top surface of the sensing platform 20 are complementary and, preferably, both substantially flat. The top surface of the sensing platform 20 may comprise a non-slip surface to securely maintain the bin 10 as items are added or removed from the bin 10. Alternatively, the adjacent surfaces of the bin 10 and sensing platform 20 may comprise an interlocking or other mating mechanism to ensure the proper placement and security of the bin 10 on the sensing platform 20. For example, one or more bottom tabs configured to fit within matching slots or other openings on the top surface of the sensing platform 20 may be included.

The sensing platform 20 may be equipped with one or more indicator status lights. The sensing platform 20 illustrated in FIG. 1 has one status light 22. In a preferred embodiment, the status light 22 is configured to be lit when the level of stocked items contained within the corresponding bin 10 falls below a minimum level (e.g., "reorder level"). A second status light (not shown) may be included to indicate when the bin 10a is adequately loaded to a particular maximum level (e.g., "fill level"). Preferably, the status lights are LEDs or other similar devices. Those of skill in the art will appreciate that fewer or more indicator status lights may be included. Further, the status lights may be configured to illuminate in different colors depending on the current level status of stocked items within a corresponding bin.

Figure 2A:
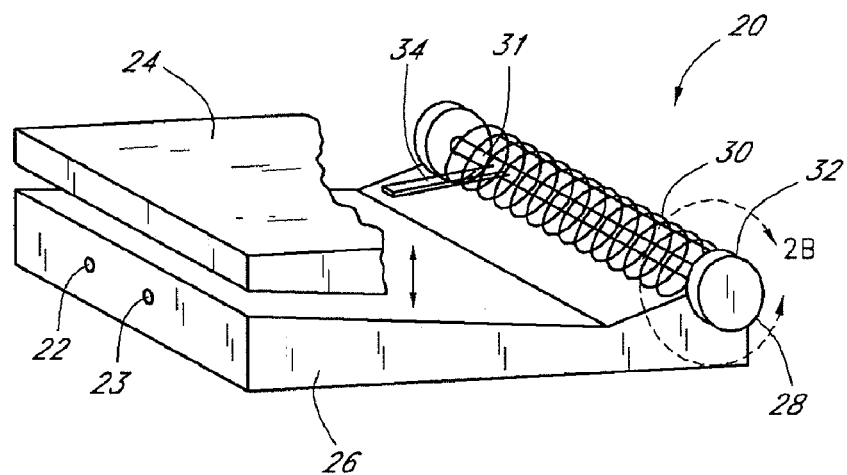
FIG. 2A is a perspective view of the sensing platform of FIG. 1 with the top portion of the platform partially removed for clarity.
Figure 2B:
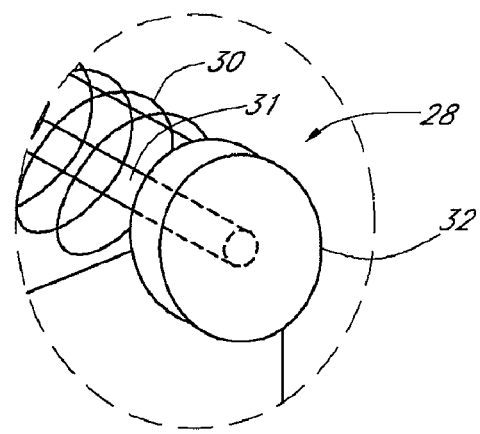
FIG. 2B is a detailed view of the hinge assembly of the sensing platform of FIG. 1.

FIG. 2A shows a detailed cutaway view of the sensing platform 20 illustrated in FIG. 1. The sensing platform 20 includes an upper portion 24 and a lower portion 26. The sensing platform is advantageously constructed of one or more durable materials such as metal, dense plastics or other composites, etc. In the illustrated arrangement, the upper portion 24 and lower portion 26 are pivotably connected to one another by a hinge assembly 28. In the illustrated embodiment, the hinge assembly 28 includes an adjustable torsion spring 30 that maintains a tension force between the upper portion 24 and lower portion 26. The torsion spring 30 is retained in a coiled configuration around a shaft 31 to which one end of the spring 30 is attached. The second end of the spring 30 abuts the adjacent surface of the upper portion 24 of the sensing platform 20. A member, such as a rod 34, may be coupled to the second end of the spring 30 to directly contact the platform 20. Thus, the tension force of the spring 30 is transferred to a vertical resisting force F between the two portions 24, 26 of the sensing platform 20. The tension force of the spring 30 is adjusted using a knob 32 that may be advantageously located at the side of the sensing platform 20 for easy access and manipulation by a user. Rotation of the knob 32 causes the torsion spring 30 to become more or less coiled, thus changing the tension force of the spring 30 and the corresponding resisting force F. In FIG. 2A, the tension force in the spring 30 is increased by turning the knob 32 clockwise. Those of skill in the art will appreciate that the spring tension may be adjusted using any other suitable or known mechanism (e.g., lever, other actuator, etc.)

Figure 2C:
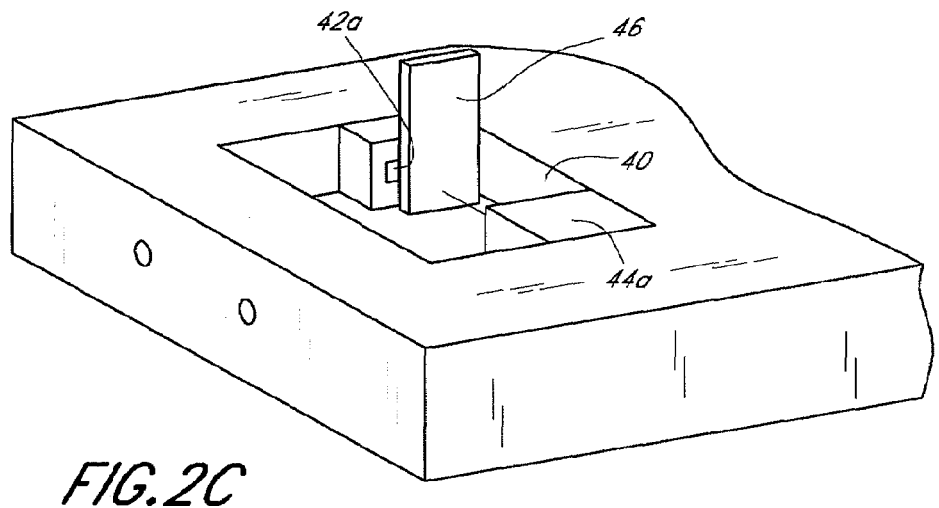
FIG. 2C is a detailed view of the bottom portion of a sensing platform according to one embodiment.

The sensing platform 20 is configured to recognize when the distance between the upper portion 24 and the lower portion 26 is further and/or closer than a particular level. In the embodiment illustrated in FIG. 2C, the lower portion 26 comprises an infrared (IR) detector for determining whether the upper portion 24 of the sensing platform 20 has attained such a triggering distance. The IR detector system is positioned within a recess 40 of the lower portion 26 of the sensing platform 20, and includes an IR emitter 42a and an IR detector 44a. As stocked items are removed from the bin, the upper portion 24 moves further from the lower portion 26, and a flag 46 attached to the underside of the upper portion 24 (not shown) ascends away from the recess 40. Eventually, if the upper portion 24 is raised sufficiently away from the lower portion 26, the flag 46 will no longer obstruct the IR beam being transmitted by the IR emitter 42a. Thus, as long as the quantity of stocked items within a bin is sufficient, the IR beam will be obstructed by the flag 46 and will not be detected by the IR detector 44a. The triggering event in such embodiments is detection of the IR beam by the IR detector 44a. Under such a configuration, the system can be notified of the need to replenish the bin with additional stocked items. Alternatively, the sensing platform 20 may be configured so that the triggering event is the obstruction of the IR beam by the flag 46 (the discontinued detection of the IR beam by the IR detector 44a). For example, if the upper portion 24 is lowered sufficiently close to the lower portion 26, the flag 46 may obstruct the IR beam being transmitted by the IR emitter 42a. In such embodiments, the triggering event may be used to determine when a sufficient quantity of stocked items has been placed within a bin during a re-stocking.

Depending on the type of sensor used, the sensing platform 20 may also include a calibration button 23 (FIGS. 1 and 2A). Once a bin has been filled to the desired level that triggers a reorder signal, one additional stocked item may be placed in the bin to test the sensitivity of the system. If, after placing an additional stocked item within the bin, a reorder signal is no longer generated, the sensitivity of the system does not require adjustment. On the other hand, if a reorder signal is still generated after the addition of the item in the bin, a sensitivity adjustment may be required. In one embodiment, the user may calibrate the sensitivity of the microcontroller associated with a particular sensor by simply pressing the calibration button 23.

Figure 2D:
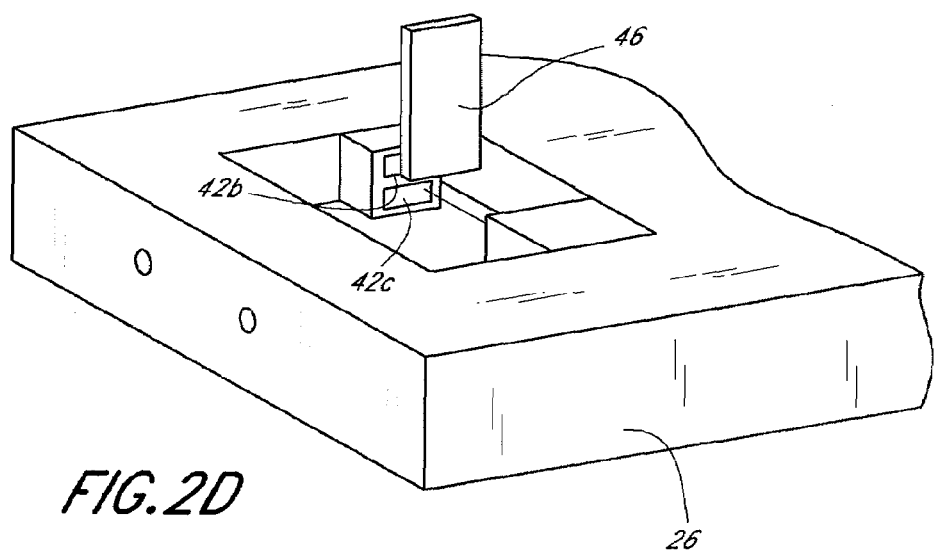
FIG. 2D is a detailed view of the bottom portion of a sensing platform according to another embodiment.

In yet other embodiments, as depicted in FIG. 2D, multiple IR emitters and detectors may be used to trigger a plurality of events. For example, the lower portion 26 may comprise two vertically-oriented IR detectors. In such an embodiment, a first triggering event occurs when the flag 46 descends closer to the lower portion 26, causing the lower IR beam to be obstructed and not capable of being detected by the lower IR detector 42C (i.e., the IR pair is deactivated). The second triggering event occurs when the flag 46 ascends to a particular height, causing the upper IR beam to be detected by the upper IR detector 42B (i.e., the IR pair is activated). Those of skill in the art will recognize that the quantity and orientation of IR emitting and detecting equipment may be altered, but preferably the system is capable of detecting certain triggering positions of the upper portion 24 relative to the lower portion 26.

Figure 3A:
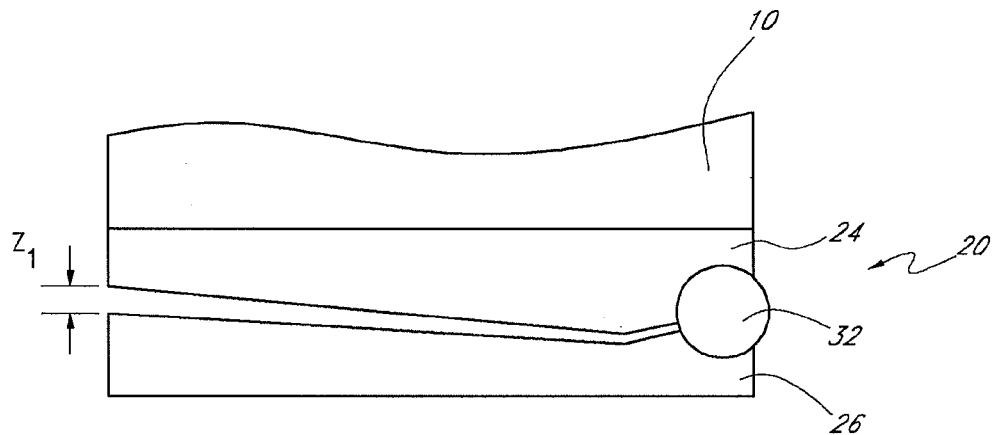
FIG. 3A is a side view of the sensing platform of FIG. 1 in a first position.
Figure 3B:
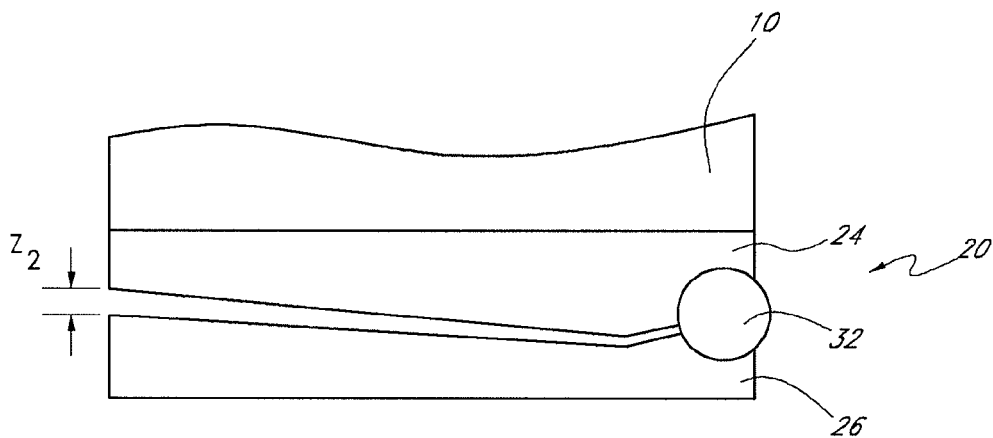
FIG. 3B is a side view of the sensing platform of FIG. 1 in a second position.

FIGS. 3A and 3B are side views of a bin 10 positioned on top of the sensing platform 20 of FIG. 2A. In FIG. 3A, the distance between the upper portion 24 and the lower portion 26 at one end of the sensing platform 20 is represented by length Z1. FIG. 3B shows the identical bin and sensing platform 20, having a similarly tensioned spring 30. However, in FIG. 3B, the distance between the upper portion 24 and the lower portion 26 is represented by length Z2, which, as illustrated, is greater than Z1. This difference in the orientation of the upper portion 24 relative to the lower portion 26 results from the varying level of stocked items within the bin. As stocked items are removed from the bin 10a, the weight on the sensing platform 20a decreases and the distance between the upper portion 24 and the lower portion 26 increases. Eventually, when enough stocked items have been removed from the bin 10, the triggering event will occur that additional stocked items must be ordered and placed within the bin 10. For example, in the embodiments using the IR emitter and detector as described above and illustrated in FIG. 2C, the flag 46 will ascend to the point where the IR beam can be detected by the IR detector 42A. This signals that stocked items within the bin have reached the designated low point, and that the bin 10 should be replenished with additional stocked items.

Other ways of determining when the level of stocked items within a particular bin has reached a particular reorder level may be used. For example, the lower portion 26 of sensing platform 20 may comprise tape sensor section. The tape sensor is capable of recognizing if the upper portion 26 contacts the tape sensor surface. Thus, in such embodiments, the reorder level may be triggered when the upper portion 24 lifts to the point where it no longer is in physical contact with the lower portion 26. Alternatively, an ultrasonic or a laser sensor may be used to detect the distance between the upper portion 24 and the lower portion 26.

The weight sensing mechanisms described above provide a reliable and inexpensive way of detecting a low bin level. According to one embodiment, in order to set the desired reorder level for such a weight-based system, the bin 10 is first placed on the sensing platform 20. Next, the bin 10 is supplied with stocked items so that the level in the bin 10 equals the desired minimum level that will trigger a reorder notification. The tension in the torsion spring 30 is then adjusted using the knob 32 or other actuator until the "reorder level" indicator light is first activated. At this point, the sensitivity of the system may be tested by adding one additional stocked item to the bin 10. The weight of the additional unit may be sufficient to bring the system above the reorder threshold. However, if the additional item is not sufficient to deactivate the "reorder level" status of the bin, the system may be recalibrated as described above using recalibration button 23. Alternatively, the reorder level may be preset during manufacturing.

Sight Level Sensors

Figure 4:
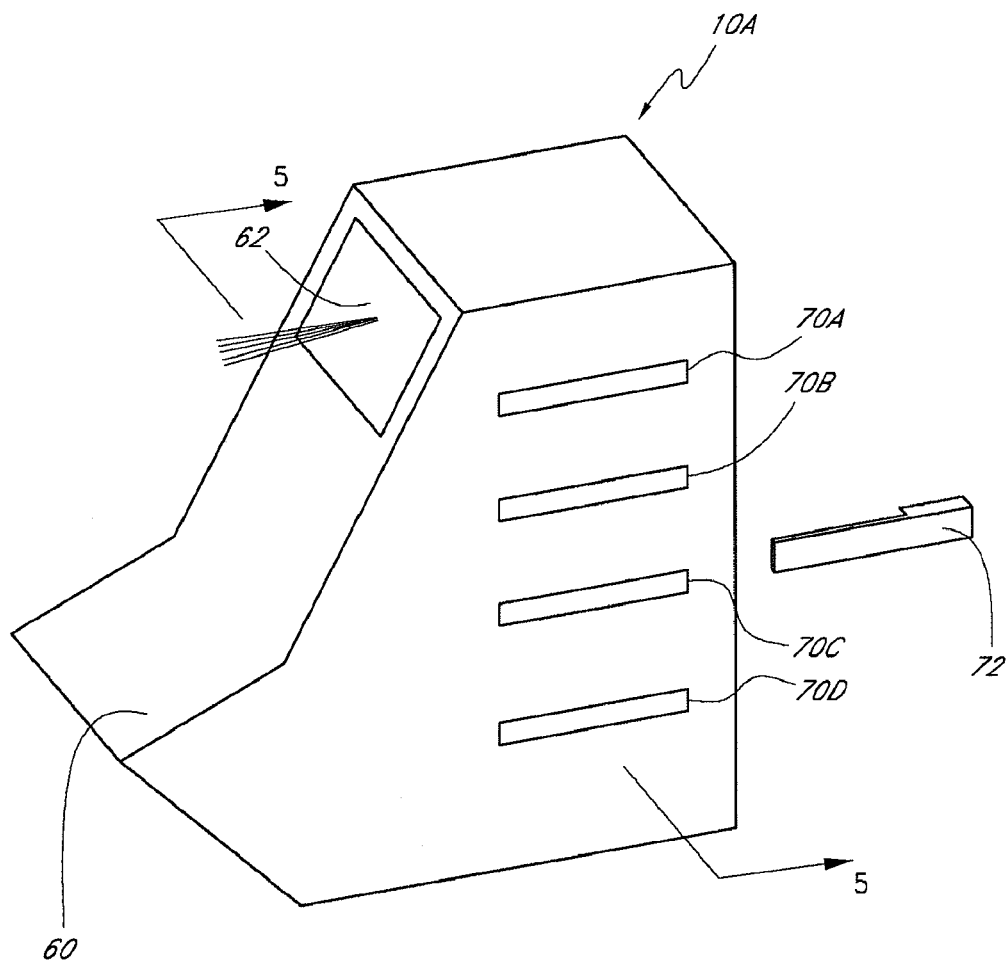
FIG. 4 is a perspective view of a bin having a built-in sensing system according to one embodiment of the present invention.
Figure 5:
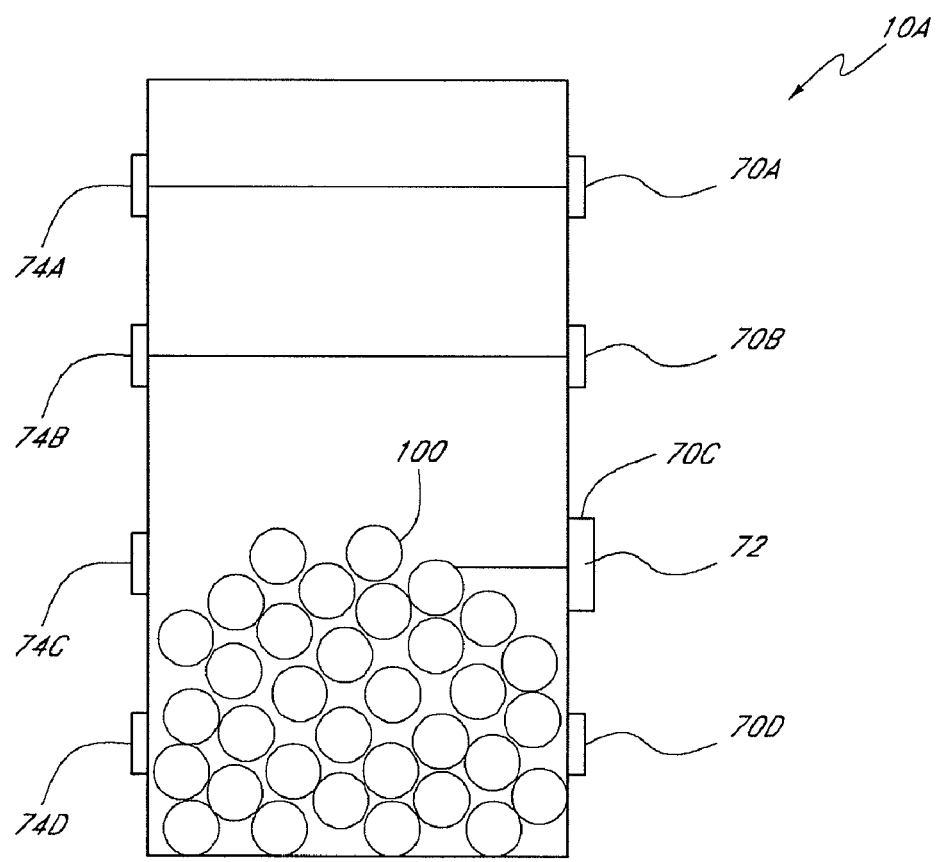
FIG. 5 is a cross-sectional view of the bin of FIG. 4, illustrating one embodiment of an internal level sensing mechanism.

FIG. 4 shows another embodiment of a bin 10a capable of producing a reorder signal when the level of stocked items drops below a designated reorder level. The bin 10a comprises an access lid 60 from where a user obtains one or more stocked items and a restock lid 62 from where stocked items are replenished. Additional lids and access points to the interior of the bin 10a may be optionally provided. In FIG. 4, the bin 10a includes an IR sensing system to determine if and when the level of stocked items within the bin 10a has dropped below a particular reorder level. One side of the bin 10a may include a plurality of mounting points for an IR emitter/detector 72. The depicted bin 10a comprises a total of four IR emitter/detector mounting points 70a-d. However, those of skill in the art will recognize that fewer or more mounting points may be used. As illustrated in FIG. 5, IR reflectors 74a-d are positioned on the opposite inner wall of the bin 10a. IR reflectors 74a-d, which are configured to reflect an oncoming IR beam, are positioned at vertical locations opposite of a corresponding mounting point 70a-d. Alternatively, a single IR reflector plate may be used in lieu of the individual IR reflectors 74a-d.

Preferably, the bin 10a is configured to permit the IR detector/emitter 72 to be easily attached and removed from each of the mounting points 70a-d. For example, the mounting points 70a-d may comprise a simple rail engagement allowing for the slidable attachment of the IR emitter/detector 72 to the side of the bin 10a. Of course, any other suitable means of attachment (e.g., snap fit, screw, etc.) may be used to secure the IR emitter/detector 72 to one of the mounting points 70a-d. The IR emitter/detector 74 is configured to emit an IR signal and detect that signal once it has been reflected back to it. The IR emitter/detector 72 should be positioned on the mounting point 70a-d corresponding to the desired reorder level for that particular bin 10a. Accordingly, each bin 10a preferably is configured with a sufficient number of mounting points to allow a user to effectively select an adequate refill level.

In FIG. 5, the IR emitter/detector 72 is positioned on mounting point 70c. As depicted, the level of stocked items 100 within the bin 10a is higher than mounting point 70c and the corresponding IR reflector 74c. Thus, the path of an IR beam transmitted from the IR emitter/detector 72 will be interrupted, at least partially, by the presence of stocked items 100. This informs the system that a sufficient number of stocked items 100 exist within the bin 10a. Alternatively, in FIG. 5, if the IR emitter/detector 72 is positioned on a higher mounting point (e.g., points 70a or 70b), the IR beam would uninterruptedly be reflected off a corresponding reflector (e.g., 74a74b) and detected by the IR emitter/detector 72. Consequently, this would inform the system that the level of stocked items 100 is below the desired reorder level. Alternatively, the system may be configured to generate a reorder signal if the IR beam is only partially blocked by stocked items. For example, a user may be permitted to select the threshold IR signal strength detected by the IR emitter/detector 72 that will trigger a reorder signal. In one embodiment, the user may select a particular percentage of emitted IR signal strength, such that a reorder signal is generated when the IR emitter/detector 72 detects an IR beam intensity that is lower than the selected signal strength. The plurality of mounting points for the IR emitter/detector 72 permit each bin 10a in the inventory control system to be customized with respect to setting a unique reorder level. Further, the bin 10a may optionally include multiple IR emitters/detectors 72 and IR reflectors.

Figure 6:
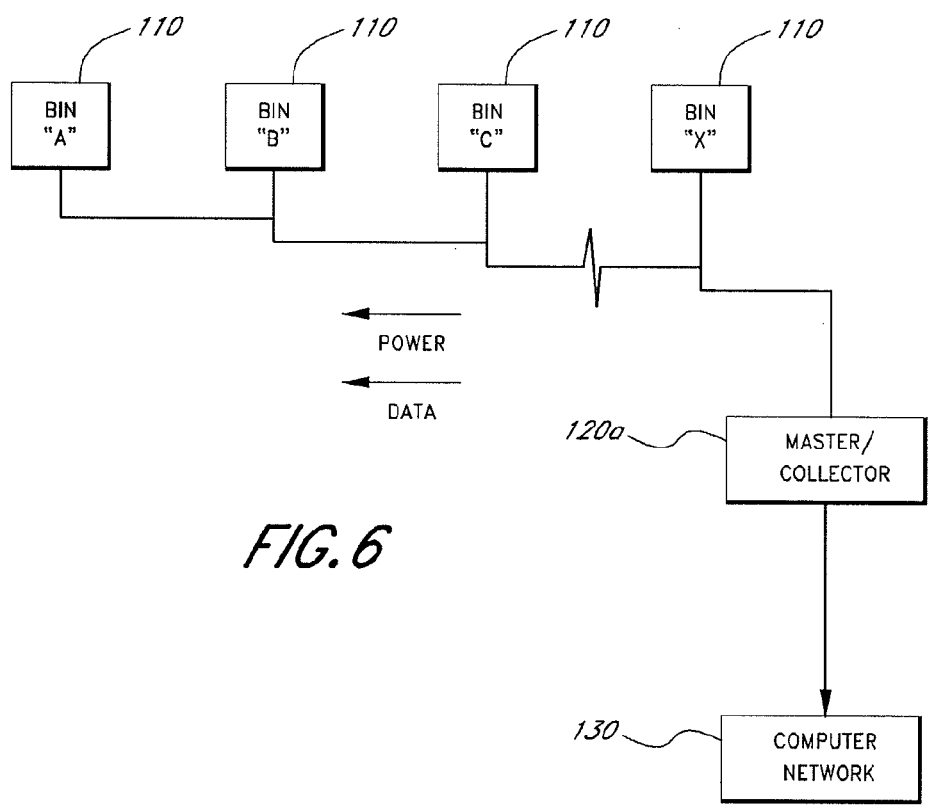
FIG. 6 is a block diagram showing communication links between various system components according to one embodiment of the present invention.

The bins of an automated inventory system may include various data or power links between each other and/or other system components. FIG. 6 shows one embodiment of an automated inventory system comprising a plurality of bins 110 connected to one another via a daisy chain link. Preferably, the link is configured to transmit both power (e.g., DC power) and data between the various bins 110. In FIG. 6, power is transmitted to the bins 110 in one direction, while data (e.g., regarding whether the bin level is adequate or low) are transmitted in the opposite direction. More preferably, bin level data daisy chain among the various bins 110 and are ultimately routed to a master collector 120a for retransmission to the internet or another computer or processor. In the illustrated embodiment, the master collector 120a retransmits the bin level data collected to a computer network 130. The master collector 120a may be contained within a portable handheld unit. Thus, a single handheld device may be used to obtain level information from the various bins of an inventory system by directly communicating with the one or more level sensing mechanisms associated with each bin. The handheld device may communicate with the various bin sensing mechanisms using either a hardwired or wireless connection. The computer network 130 may optionally incorporate the level data it receives into an Enterprise Resource Planning (ERP) system. Alternatively, the level data may be delivered to a Subscriber Identity Module (SIM), a personal computer, an internet supported system or any other type of device or system that may use such information.

Wireless Circuit Sensor

Figure 7:
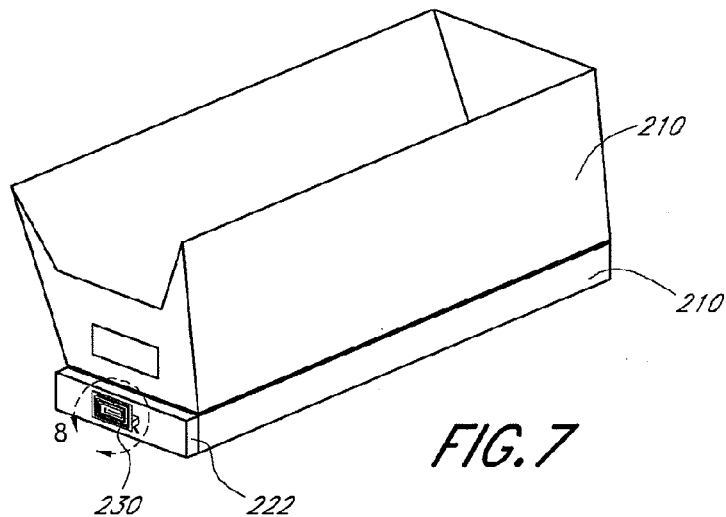
FIG. 7 is a perspective view of a bin positioned on top of a sensing platform according to another embodiment of the present invention.
Figure 8:
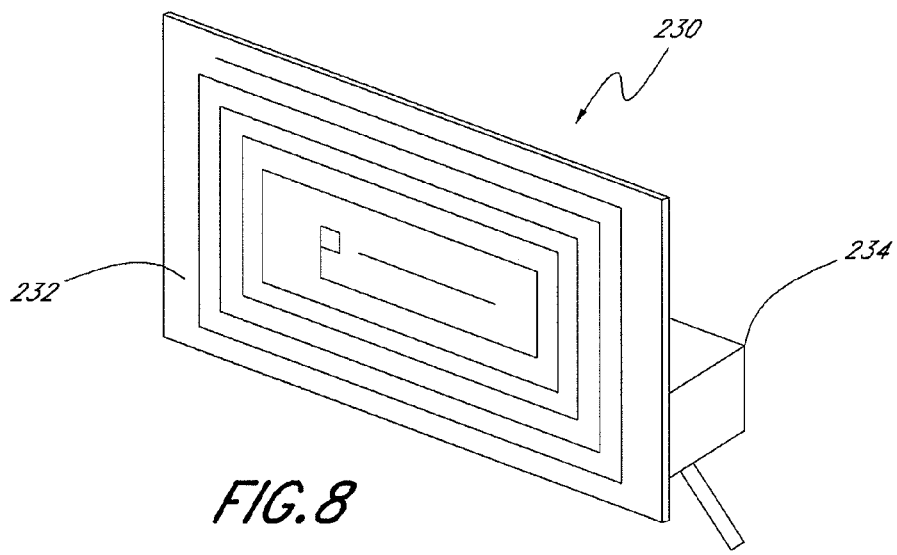
FIG. 8 is a detailed view of a circuit assembly used for a sensing platform according to one embodiment.
Figure 9A:
FIG. 9A is a schematic of a limit switch in a first position.
Figure 9B:
FIG. 9B is a schematic of a limit switch in a second position.

FIG. 7 illustrates a bin 210 situated on top a sensing platform 220 comprising a hybrid circuit for detecting the level of stocked items within the bin 210. As depicted, the front portion 232 of the sensing platform 220 comprises a hybrid circuit assembly 230. In the embodiment shown in FIG. 8, the hybrid circuit assembly 230 includes a sensor, such as a mechanical limit switch 234, connected to a printed circuit board (PCB) 232. Other suitable sensors could be used, such as those identified above. Preferably, the PCB 232 comprises a radio frequency identification (RFID) style coil and responder. As long as stocked items in the bin 210 remain above a particular threshold level, the limit switch 234 remains in the open position (FIG. 9A). This prevents the circuit on the attached PCB 232 from being completed. When a sufficient number of items have been removed from the bin 210, the limit switch 234 closes (FIG. 9B), and the PCB circuit is completed.

In some embodiments, the PCB 232 is configured to permit an RFID label to be read upon completion of the circuit. If the reorder level has been attained, the completed circuit will transmit an RFID signal. Consequently, an RFID reader device may be used to determine whether the level in a particular bin 210 has dropped below a designated reorder threshold. FIGS. 10A and 10B illustrate embodiments of a handheld RFID reader device 240 that is configured to detect completed hybrid RFID style PCB circuits as described with reference to FIGS. 7 and 8. In FIG. 10A, stocked items 200 in both bins 210 are above the reorder level. Consequently, the mechanical limit switch 234 of each hybrid circuit assembly 230 remains open and the PCB circuit is uncompleted. Thus, the RFID labels for those PCBs will not be read by the RFID reader device 240. In FIG. 10B, the level of stocked items 200 in one of the bins 210 (Bin No. 1) is above the reorder level, while the level in the other bin 210 (Bin No. 2) is below the reorder level. Thus, only the circuit associated with Bin No. 2 will be completed, and thus, capable of transmitting the necessary RFID signal. The PCB circuit for each bin 210 preferably includes a unique identifier so that the RFID reader device 240 recognizes which bins 210 require restocking. In addition, the PCB circuit may be configured to optionally transmit date/time information related to a particular reading. Such data could be used to determine if an updated reading is required for reordering purposes. Alternatively, the date/time stamp information may be used to track employee efficiency and performance.

Alternatively, a sensing platform may include a circuit assembly that is configured to constantly transmit a signal. For example, the PCB circuit may transmit one signal when the threshold reorder level has been reached and a different signal when a sufficient quantity of stocked goods still remains in the corresponding bin. In one arrangement, this may be accomplished using two different circuits on a single platform. The first circuit would be configured to be completed, and thus begin to transmit a signal, when the level of stocked items was below the reorder level. Conversely, the second circuit would be configured to be completed only when the level of stocked items was at or above the reorder level. Alternatively, a single circuit configured to transmit different signals based on the bin level may be used. Any suitable sensor could be used, such as those identified above, to complete the circuits. Since a signal is always generated at each bin irrespective of level, such embodiments provide additional assurance that all bins have been properly scanned.

In another embodiment, a platform may include a circuit that continuously transmits a signal for the sole purpose of identifying that particular bin. Thus, confirmation that a bin was adequately scanned may still be obtained even if such an identifying circuit is used in conjunction with another circuit configured to only transmit a bin level signal upon the occurrence of a triggering event (e.g., quantity of stocked items has dropped below the reorder level). Those of skill in the art will appreciate that this may be alternatively accomplished using a single circuit configured to simultaneously transmit two or more different signals.

Figure 11:
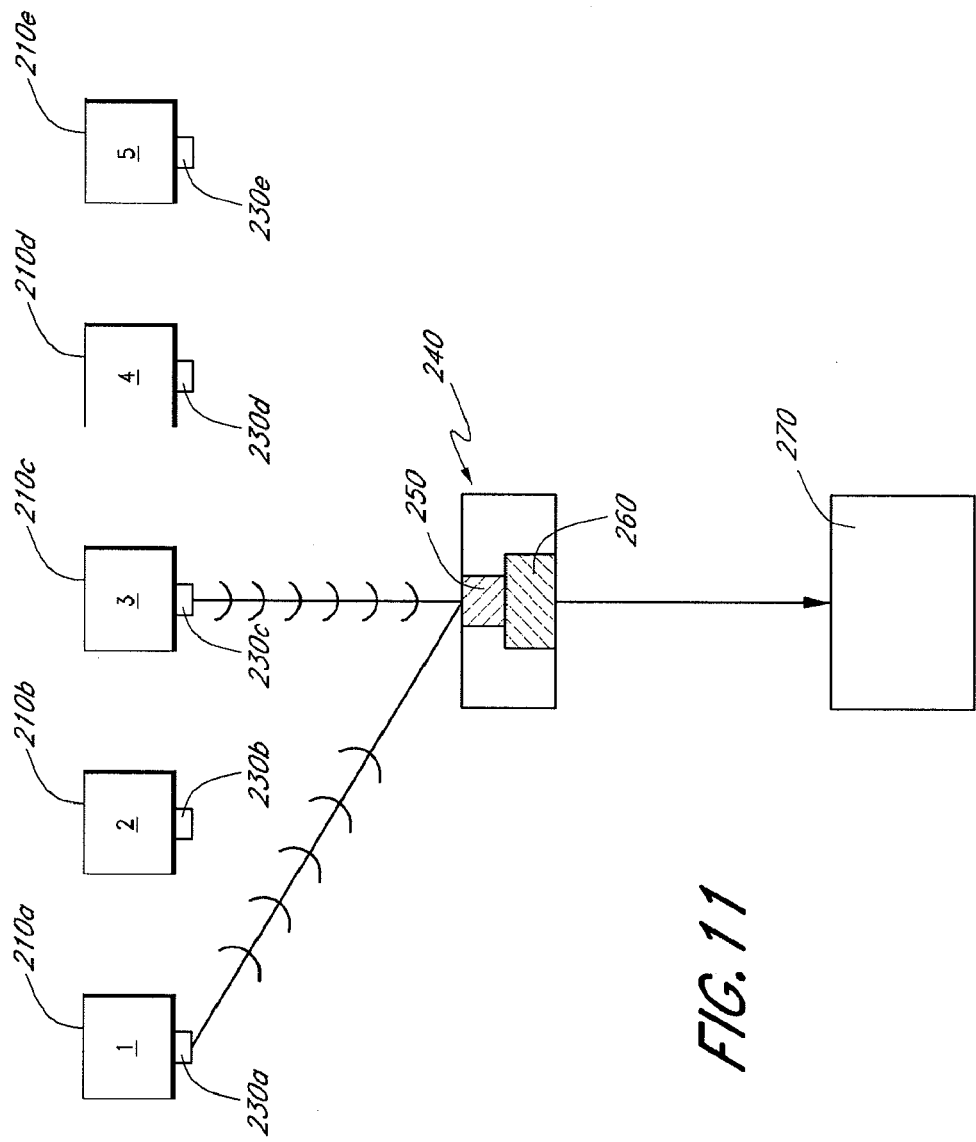
FIG. 11 is a diagram showing communication links between various system components according to one embodiment of the present invention.

FIG. 11 illustrates a schematic representation of an inventory system utilizing the hybrid circuit sensor system described above. The depicted embodiment comprises five bins 210a-e, each of which includes a hybrid circuit assembly 230a-e capable of transmitting a unique RFID signal when the level of stocked items drops below a designated reorder level. An RFID reader device 240 comprises a RFID detector 250 and one or more microcontroller units 260. The RFID reader device 240 is passed within the transmission zone of the RFID signals emitted by each circuit assembly 230a-e. In FIG. 11, only the hybrid circuit assemblies for Bin Nos. 1 and 3 are transmitting an RFID signal, indicating that the level of stocked items within those bins 210a, 210c has dropped below the reorder level. For convenience, the RFID signals emitted by the bins are shown to be directed towards the RFID reader device 240. However, depending on the type of RFID circuit assembly used, the spacing of the bins 210a-e, the distance between the RFID reader device 240 and the bins 210a-e and other factors, the RFID reader device 240 may not be capable of detecting all RFID signals from a single location as shown in FIG. 11. Thus, the RFID reader device 240 is preferably passed directly in front of each bin to ensure that a proper reading occurs. Preferably, the RFID reader device 240 is an inexpensive handheld wand-type unit that may be easily maintained and/or replaced. However, one or more stationary RFID reader devices may be employed. The use of RFID or other wireless technology with such systems eliminates the need for hardwired systems that are difficult and expensive to install, maintain and relocate.

Such handheld devices can be passed within the transmission zone of the different bins that comprise a particular inventory system. The RFID detector 250 of the RFID reader device 240 is configured to detect RFID signals originating from bins with low stocked item levels. This RFID data is processed by one or more microcontroller units 260 located within the RFID reader device 240. The unique identifiers contained within the transmitted RFID signals permit the microcontroller units 260 to determine which bins 210a-e require additional stocked items. The level data compiled by the microcontroller units 260 are communicated to a computer network 270 via a hardwired (e.g., Ethernet, cable, etc.) or wireless (e.g., RFID, Wi-Fi, etc.) connection. Alternatively, such data may be communicated to the internet, another microcontroller or any other desired system. Information regarding the need to reorder stocked items for particular bins may be communicated to the responsible persons and/or entities. In one arrangement, such information may be communicated to a third party service provider that processes data and generates appropriate orders or order information. The orders or order information may be transmitted to the customer for approval and/or to suppliers. Alternatively, such information is directly communicated to one or more suppliers responsible for restocking the bins 210a-e. In other embodiments, the system may be configured with wireless and/or hard-wired connections other than RFID to communicate between a reader device and the sensors of each bin.

Although certain embodiments and examples have been described herein, it will be understood by those skilled in the art that many aspects of the methods and devices shown and described in the present disclosure may be differently combined and/or modified to form still further embodiments. Additionally, it will be recognized that the methods described herein may be practiced using any device suitable for performing the recited steps. Such alternative embodiments and/or uses of the methods and devices described above and obvious modifications and equivalents thereof are intended to be within the scope of the present disclosure. Thus, it is intended that the scope of the present invention should not be limited by the particular embodiments described above, but should be determined by a fair reading of the claims that follow.

What is claimed is:

1. An automated inventory system comprising:
   a bin configured to contain a plurality of stocked items;
   a platform that supports said bin, said platform having an upper portion and a lower portion, where said bin is supported on said upper portion;
   a biasing member that provides a resistive force tending to separate said upper portion and said lower portion of said platform, wherein a separation distance between said upper portion and said lower portion of said platform varies in response to a weight of said plurality of stocked items;
   a wireless circuit associated with said platform comprising:
      a printed circuit board;
      a switch that is open when a weight of said plurality of stocked items is sufficient to overcome said resistive force of said biasing member and maintain said separation distance below a threshold separation distance, wherein said switch completes said wireless circuit when said weight of said plurality of stocked items is not sufficient to overcome said resistive force of said biasing member and maintain said separation distance below said threshold separation distance;
      wherein said printed circuit board transmits a wireless signal when said wireless circuit is completed; and
   a portable, handheld wireless reader device comprising at least one microcontroller unit;
   wherein, the wireless reader device is reads said wireless signal transmitted by said printed circuit board upon completion of said wireless circuit.

2. The automated inventory system of claim 1, wherein the circuit is configured to transmit a RFID signal.

3. A method of automatically maintaining a stocked item inventory comprising the steps of:
   providing a plurality of storage bins; providing a platform for each of said plurality of bins, said platform comprising at least one wireless circuit, said at least one wireless circuit transmitting a first wireless signal only when a bin inventory level is either above a threshold reorder level and not below said threshold reorder level or when said bin inventory level is below said threshold reorder level and not above said threshold reorder level, said at least one wireless circuit transmitting a second wireless signal at least when said first wireless signal is not being transmitted;
   wherein the first wireless signal detects inventory level of each of said plurality of storage bins;
   wherein the second wireless signal confirms that each of said plurality of storage bins have been read;
   providing a portable, hand held wireless reader device comprising a microprocessor and configured to read said first wireless signal and said second wireless signal, said wireless reader device further configured to process bin level data associated with such wireless signals on said microprocessor;

passing said portable, hand held wireless reader device within a sufficiently close proximity to each of said plurality of storage bins to permit said first and second wireless signals to be read;

retransmitting said bin level data; and verifying that at least one of said first and second wireless signals has been read for each of said plurality of storage bins;

wherein said first and second wireless signals comprise RFID signals.

4. The method of claim 3, wherein said retransmitting is to a personal computer network.

5. The method of claim 3, wherein said retransmitting is to a computer network.

6. The automated inventory system of claim 1, wherein said switch comprises a mechanical limit switch.

7. The method of claim 3, wherein said at least one wireless circuit transmits said second wireless signal only when said first wireless signal is not being transmitted.

* * * * *